(12) United States Patent
Ann et al.

(10) Patent No.: US 9,860,331 B2
(45) Date of Patent: Jan. 2, 2018

(54) GAME SERVICE SYSTEM AND GAME SERVICE METHOD FOR GLOBAL GAME SERVICE

(71) Applicant: NHN Entertainment Corporation, Seongnam-si (KR)

(72) Inventors: Seong Joon Ann, Seongnam-si (KR); Guiun Oh, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 403 days.

(21) Appl. No.: 14/736,788

(22) Filed: Jun. 11, 2015

(65) Prior Publication Data

US 2015/0365489 A1 Dec. 17, 2015

(30) Foreign Application Priority Data

Jun. 13, 2014 (KR) .................. 10-2014-0072043
Jun. 13, 2014 (KR) .................. 10-2014-0072044

(51) Int. Cl.
*H04L 29/08* (2006.01)
*H04L 29/06* (2006.01)

(52) U.S. Cl.
CPC ............. *H04L 67/28* (2013.01); *H04L 67/38* (2013.01)

(58) Field of Classification Search
CPC ....... H04L 67/28; H04L 67/38; H04N 21/222; A63F 13/352; A63F 13/48
See application file for complete search history.

(56) References Cited

U.S. PATENT DOCUMENTS

2004/0127289 A1* 7/2004 Davis ................ A63F 13/12
463/42
2005/0227767 A1 10/2005 Shimomura et al.
(Continued)

FOREIGN PATENT DOCUMENTS

JP 2005-301578 10/2005
JP 2007-061616 3/2007
(Continued)

OTHER PUBLICATIONS

Japanese Office Action dated Nov. 1, 2016, for Japanese patent application No. 2015-114899.
(Continued)

*Primary Examiner* — Arvin Eskandarnia
(74) *Attorney, Agent, or Firm* — H.C. Park & Associates, PLC

(57) ABSTRACT

Provided are a game service system and a game service method for a global game service. A game service system for providing a multi-player game service for users connected to a game server and users connected to at least one proxy server includes: a game server constructed at a single base in a first local area, the game server configured to provide game progress data to users connected to a proxy server associated with the game server; and at least one proxy server constructed at a base in a second local area different from the first local area in which the single base is located, and configured to connect to the game server through an exclusive line. The game server is configured to provide the game service to users connected to the at least one proxy server through the at least one proxy server and the exclusive line.

9 Claims, 14 Drawing Sheets

(56) References Cited

U.S. PATENT DOCUMENTS

| | | |
|---|---|---|
| 2006/0259623 A1 | 11/2006 | Crawford et al. |
| 2010/0041481 A1* | 2/2010 | Smedley ............... A63F 13/12 463/42 |
| 2010/0285875 A1* | 11/2010 | McKenna ............. A63F 13/12 463/31 |
| 2013/0102392 A1 | 4/2013 | Nakata et al. |

FOREIGN PATENT DOCUMENTS

| | | |
|---|---|---|
| JP | 2008-545455 | 12/2008 |
| JP | 2009-011712 | 1/2009 |
| JP | 2013-085819 | 5/2013 |
| KR | 10-2007-0061341 | 6/2007 |
| KR | 10-0743896 | 7/2007 |

OTHER PUBLICATIONS

"Klab opens open source "AccelTCP" software that accelerates communications with overseas up to 50% or more.", Apr. 25, 2014, https://www.idcf.jp/pressrelease/2014/20140425001.html [tanslation via Chrome].

Korean Office Action dated Dec. 19, 2016, for Korean patent application No. 10-2014-0072043.

* cited by examiner

500

GAME SERVICE SYSTEM AND GAME SERVICE METHOD FOR GLOBAL GAME SERVICE

CROSS-REFERENCE TO RELATED APPLICATIONS

This application claims priority from and the benefit of Korean Patent Application No. 10-2014-0072043, filed on Jun. 13, 2014, and Korean Patent Application No. 10-2014-0072044, filed on Jun. 13, 2014, which are hereby incorporated by reference for all purposes as if fully set forth herein.

BACKGROUND

Field

Example embodiments relate to a game service system and a game service method for a global game service.

Discussion of the Background

Online games refer to games services based on a network connection. Examples of online games include games being played based on an Internet connection and mostly correspond to multimedia games designed to perform multiple user plays performed through the Internet connection. Users may be provided with an online game service by directly connecting to servers that provide the online game service.

FIG. 1 illustrates a structure of a system for a game service according to the related art. Referring to FIG. 1, to use a game service, a user may be provided with a game play service by connecting to a game service platform 120 using a user terminal 110, by connecting to a lobby server 140 of a predetermined channel using a channel list 130 provided from the game service platform 120, and by connecting to a room server 150 that provides a game room selected at the lobby server 140. In this instance, a multi-player game such as a match between users connected to the same lobby server 140 may be performed. For example, the lobby server 140 and the room server 150 may provide matching or a game service for a match between users using a database 160. In FIG. 1, a section connected with solid lines indicates a last-mile section, for example, a section for the user terminal 110 to connect to individual servers, for example, the game service platform 120, the lobby server 140, the room server 150, and the channel list 130. A section connected with dotted lines indicates a mild-mile section that is an internal section between game service providing devices other than the user terminal 110. In addition, the game service platform 120 may indicate a platform for a game portal service.

As described above, in the related art, the user may use the game service by directly connecting to individual servers and thus, it is more likely that the user may experience network delay of the last-mile section that is a section for the user terminal 110 to connect to the individual servers, for example, the game service platform 120, the lobby server 140, the room server 150, and the channel list 130 connected with solid lines. In particular, in the last-mile section, the user terminal 110 and the individual servers communicate with each other using a general communication line, for example, wired or wireless Internet. Accordingly, a game service provider may have no way for solving the network delay. Considering the current evolution of the mobile communication environment, the above issue may further increase.

Also, due to system architecture according to the related art in which users connect to individual servers, a multi-player game is allowed only between users connected to the same channel or the same channel lobby server. For example, in a global game service, users in Korea may connect to a lobby server constructed in Korea and may play a multi-player game between the users of Korea. Users in Philippines may connect to a lobby server constructed in Philippines and may play a multi-player game between the users of Philippines.

To enable a match between users connected to different servers, an inter-user multi-player service may be provided using a game server by disconnecting the connection of users to existing game servers and by connecting the users to the same game server, for example, a single lobby server. Thus, the process is complex and delay occurs for progress of the above process.

Further, if a user in Philippines is to connect to a server constructed in Korea to support further various inter-user multi-player games, a last-mile section between the user of Philippines and the server of Korea is significantly extended. Accordingly, although connections of users are brought together at a single game server, the quality of game service for the users may not be guaranteed.

FIG. 2 illustrates an example of a system construction for providing a global game service according to the related art. It is assumed that three countries, for example, a first country 210, a second country 220, and a third country 230, provide a global game service. Here, in the related art, game servers are constructed for individual countries, respectively. For example, a first game server 211 is constructed in the first country 210, a second game server 221 is constructed in the second country 220, and a third game server 231 is constructed in the third country 230. Users of each country connect to a game server constructed in the corresponding country and play a game through the connected game servers, respectively. For example, users of the first country 210 connect to the first game server 211 and play a game. In this example, in the related art, a multi-player game is allowed only between users connected to the same game server. For a multi-player game between users of different countries, users of other countries connect to a predetermined game server constructed in a predetermined country to play the game with the user in the predetermined country. For example, users of the second country 220 and the third country 230 connect to the first game server 211 of the first country 210 to play a game with users of the first country 210. In this example, the users of the second country 220 and the third country 230 may experience network delay at a last-mile section, that is, an inter-country section and thus, it may be difficult to substantially provide a global multi-player game. Similarly, the above issue may arise even in a single country in which a plurality of Internet data centers (IDCs) are present.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a game service system and a game service method that may enable users of a game service to use the game service through connection to a proxy server constructed for each region without directly connecting to individual servers, such as a lobby server or a room server, and may connect the proxy server and a game server using an exclusive line, thereby minimizing a last-mile section and securing the communication performance and stability between a client and a server.

Exemplary embodiments provide a game service system and a game service method that enable a lobby server in an integrated lobby form to relay communication with proxy servers and enable a backend of the lobby server to provide a game service through a room server, thereby providing a game service so that all the connected users may play a multi-player game (also referred to herein as "multi-play").

Additional aspects will be set forth in the detailed description which follows, and, in part, will be apparent from the disclosure, or may be learned by practice of the inventive concept.

An exemplary embodiment discloses a game service system for providing a multi-player game service for users connected to a game server and users connected to at least one proxy server, the game service system including: a game server constructed at a single base in a first local area, the game server configured to provide game progress data to users connected to a proxy server associated with the game server; and at least one proxy server constructed at a base in a second local area different from the first local area in which the single base is located, and configured to connect to the game server through an exclusive line. The game server is configured to provide the game service to users connected to the at least one proxy server through the at least one proxy server and the exclusive line.

An exemplary embodiment discloses a game server for providing a game service in a global environment, the game server including an information receiver configured to receive information about users connected to at least one proxy server from the at least one proxy server connected through an exclusive line, a user matcher configured to match users based on the received information and information about the users connected to the game server, and a game service provider configured to relay and process game progress data between the matched users to service a multi-player game to the matched users. The game server is constructed at a base of a country different from a country in which the at least one proxy server is constructed.

An exemplary embodiment discloses a proxy server for providing a game service in a global environment, the proxy server including a user authentication processor configured to process authentication of users connected to the proxy server, an information transmitter configured to transmit information about the authenticated users to a game server connected to the proxy server through an exclusive line and constructed in another country different from a county in which the proxy server is constructed, and an information forwarder configured to receive information relayed and processed at the game server and to forward the received information to a user corresponding to the received information, to service a multi-player game with users of the other country or users of still another country in which another proxy server connected with the game server is constructed.

An exemplary embodiment discloses a game service system for providing a multi-player game service for users connected to a game server and users connected to at least one proxy server, the game service system including: a game server located in a first local area and connected to at least one proxy server located in a second local area different from the first local area, the game server and the at least one proxy server being connected through an exclusive line. The game server includes: an integrated lobby server configured to match users directly connected to the game server and users connected to the at least one proxy server, and to provide game progress data to users connected to the at least one proxy server; and at least one room server constructed at a back end of the integrated lobby server and configured to provide a multi-player game service to the matched users through the integrated lobby server.

An exemplary embodiment discloses a game service method of a game server providing a multi-player game service for users connected to a game server and users connected to at least one proxy server, the method including: receiving information about users connected to at least one proxy server from the at least one proxy server connected to the game server through an exclusive line; matching users based on the received information and information about users connected to the game server; and relaying and processing game progress data between the matched users to service a multi-player game to the matched users. The game server is constructed at a base in a first local area different from a second local area in which the at least one proxy is constructed.

An exemplary embodiment discloses a game service method of a proxy server providing a multi-player game service for users connected to a game server and users connected to at least one proxy server, the method including: processing authentication of users connected to at least one proxy server; transmitting information about the authenticated users to a game server connected to the at least one proxy server through an exclusive line and constructed in a first local area different from a second local area in which the proxy server is constructed; and receiving information relayed and processed at the game server and forwarding the received information to a user corresponding to the received information, to service a multi-player game with users connected to the game server in the first local area and users connected to the at least one proxy server in the second local area.

An exemplary embodiment discloses a game service system for providing a game service in a global environment, the game service system including a game server and at least one proxy server constructed in different countries, respectively, the game server and the at least one proxy server being connected through an exclusive line. The game server includes an integrated lobby server configured to match users directly connected to the game server and users connected to the at least one proxy server, and at least one room server constructed at a back end of the integrated lobby server, and configured to provide a multi-player game service to the matched users through the integrated lobby server.

An exemplary embodiment discloses an integrated lobby server included in a game server providing a game service in a global environment, the integrated lobby server including an information receiver configured to receive information about the users connected to at least one proxy server from the at least one proxy server constructed in a country different from a country in which the game server is constructed, and connected with the game server through an exclusive line, a user matcher configured to match users based on the received information and information about the users directly connected to the game server, and a data relay configured to relay game progress data between the room server providing the multi-player game service to the matched users and the matched users.

An exemplary embodiment discloses a room server included in a game server providing a game service in a global environment, the room server including a user verifier configured to verify users matched at an integrated lobby server among users connected to the game server and users connected to at least one proxy server, and a game service provider configured to provide a multi-player game service to the verified users. The game progress data of the multi-player game service is relayed to the matched users through the integrated lobby server.

An exemplary embodiment discloses a game service method of an integrated lobby server included in a game server providing a game service in a global environment, the method including receiving information about users connected to at least one proxy server from the at least one proxy server constructed in a country different from a country in which the game server is constructed and connected with the game server through an exclusive line, matching users based on the received information and information about users directly connected to the game server, and relaying game progress data between a room server providing a multi-player game service to the matched users and the matched users.

An exemplary embodiment discloses a game service method of a room server included in a game server providing a game service in a global environment, the method including verifying users matched at an integrated lobby server among users connected to the game server and users connected to at least one proxy server, the game server and the at least one proxy server constructed in different countries and connected through an exclusive line, and providing a multi-player game service to the verified users. Game progress data of the multi-player game service is relayed to the matched users through the integrated lobby server.

An exemplary embodiment discloses a game service method of an integrated lobby server included in a game server providing a multi-player game service for users connected to a game server and users connected to at least one proxy server, the method including: setting up, by a game server located in a first local area, an exclusive connection with at least one proxy server in a second local area, the at least one proxy server being connected with the game server through an exclusive line; receiving information about users connected to the at least one proxy server from the at least one proxy server; matching users based on the received information and information about users directly connected to the game server; and relaying game progress data between a room server providing a multi-player game service to the matched users and the matched users.

According to an exemplary embodiment, it is possible to minimize a last-mile section and to secure the communication performance and stability between a client and a server by enabling users of a game service to use the game service through connection to a proxy server constructed for each region without directly connecting to individual servers, such as a lobby server or a room server, and by connecting the proxy server and a game server using an exclusive line.

According to an exemplary embodiment, it is possible to provide a game service so that all the connected users may play a multi-player game by enabling a lobby server in an integrated lobby form to relay communication with proxy servers and by enabling a backend of the lobby server to provide a game service through a room server.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
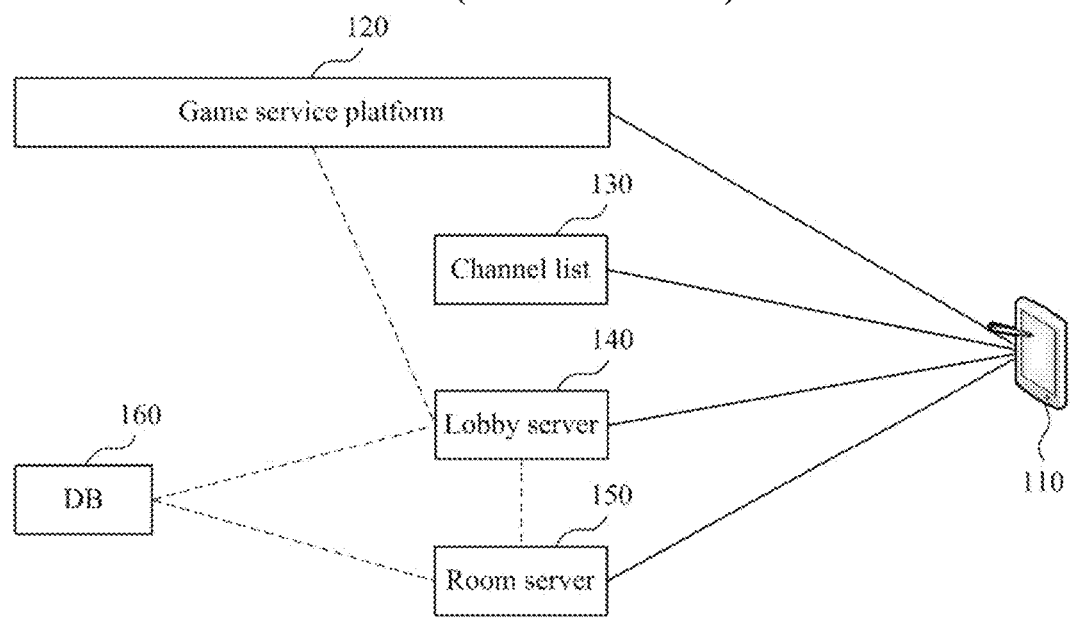
FIG. 1 illustrates a structure of a system for a game service according to the related art.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 3:
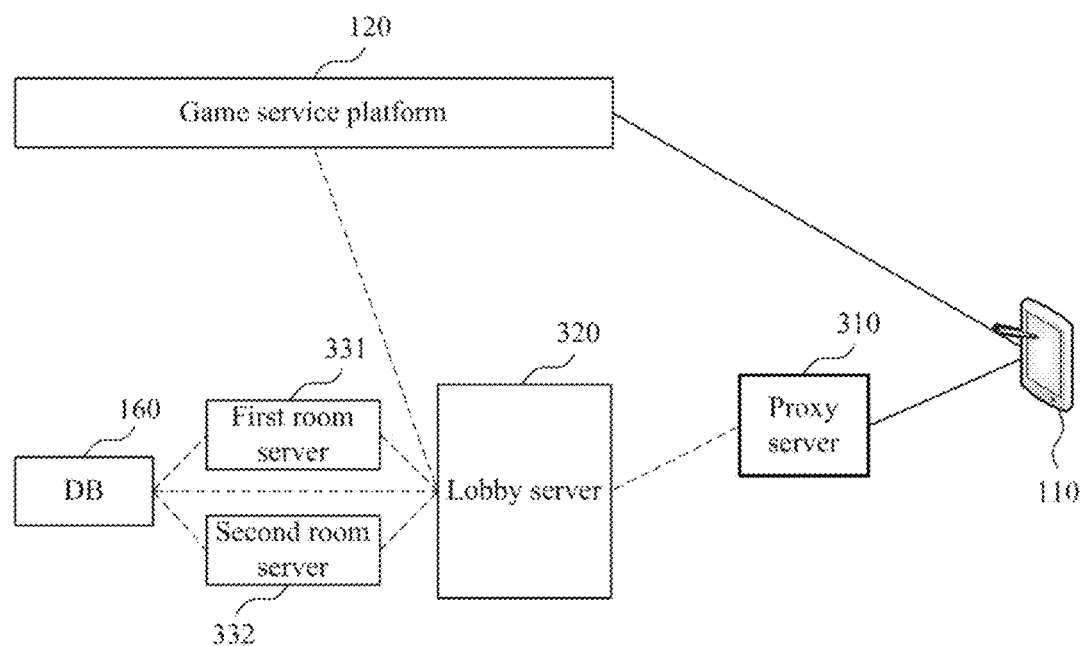
FIG. 3 illustrates a structure of a system for a game service according to an exemplary embodiment.

FIG. 3 illustrates a structure of a system for a game service according to an exemplary embodiment. Unlike the related art of FIG. 1, FIG. 3 illustrates an example in which a user terminal 110 is connected to a proxy server 310 instead of connecting to individual lobby servers or individual room servers. The proxy server 310 may be constructed for each region to service a game for each region, for example, a global online game. A lobby server 320 in an integrated lobby form may relay communication between the proxy servers 310 constructed for each region and room servers, for example, a first room server 331 and a second room server 332, constructed at a back end of the lobby server 320. Here, an exclusive line may be constructed between the proxy server 310 and the lobby server 320 and accordingly, the proxy server 310 and the lobby server 320 may be mutually connected through the exclusive line. The exclusive line (or a dedicated line) may include a communications cable or another facility dedicated to a specific application or a specific device, in contrast to a shared resource such as the Internet.

Thus, a last-mile section is reduced to the section between the user terminal 110 and the proxy server 310 and thus, network delay of the last-mile section may decrease, thereby enhancing the communication performance and stability. Also, since the lobby server 320 relays all the communication between the proxy server 310 and the room servers, all of the users may play a multi-player game without leaving a connected server. An example of decreasing a last-mile section using the proxy server 310 will be described with reference to FIG. 4.

Figure 4:
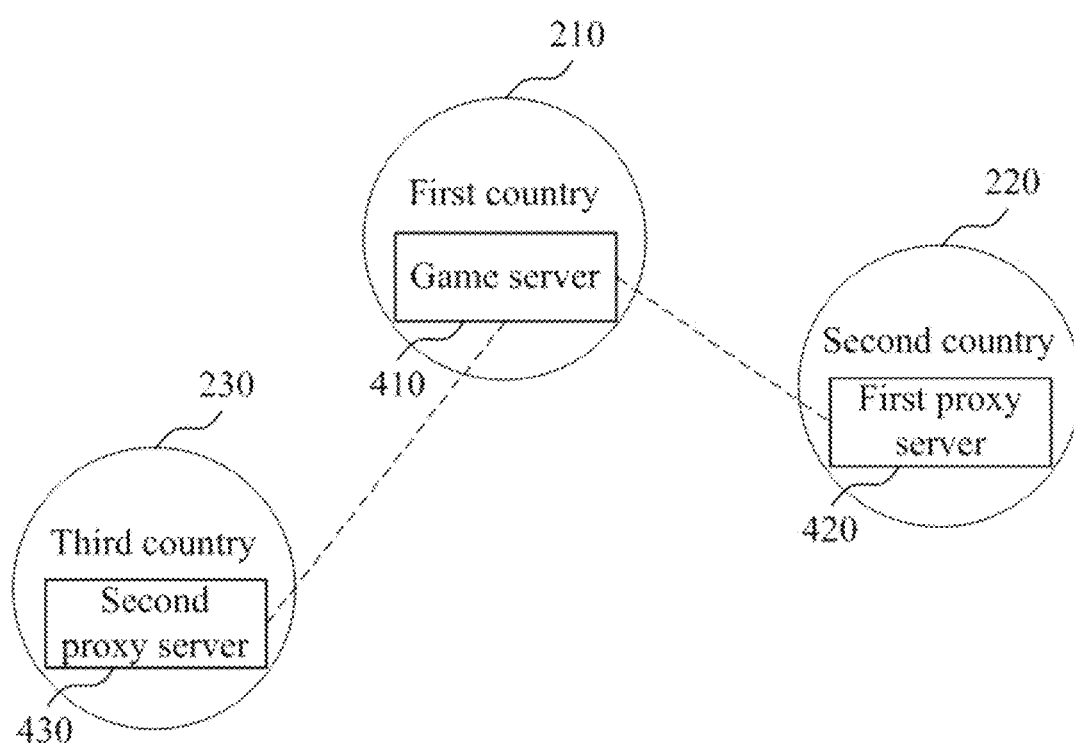
FIG. 4 illustrates an example of a system construction for providing a global game service according to an exemplary embodiment.

FIG. 4 illustrates an example of a system construction for providing a global game service according to an exemplary embodiment. In FIG. 4, when three countries, a first country 210, a second country 220, and a third country 230, provide a global game service, a game server 410 constructed in the first country 210 is selected based on a geographical location, and a first proxy server 420 constructed in the second country 220 and a second proxy server 430 constructed in the third country 230 communicate with the game server 410 in the first country 210. Since there is no need to construct a game server for each country, it may be possible to save costs used to advance to a local area in order to provide a game service. For example, a global game service may be provided by including a database or a platform in only the game server 410 and by constructing minimum local infrastructures required for connection and communication in the first and second proxy servers 420 and 430.

Further, users of the first country 210 may use a game service by connecting to the game server 410, users of the second country 220 may use the game service by connecting to the first proxy server 420, and users of the third country 230 may use the game service by connecting to the second proxy server 430. The first proxy server 420 and the second proxy server 430 may provide the game service to connected users by communicating with the game server 410 through the respective exclusive line.

Figure 2:
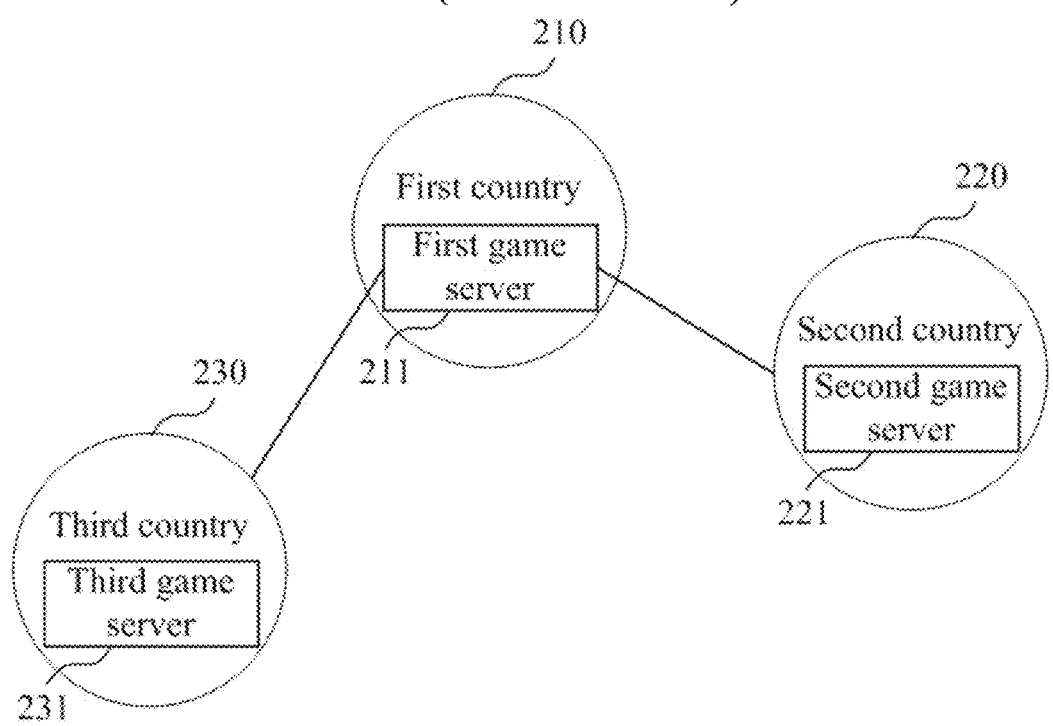
FIG. 2 illustrates an example of a system construction for providing a global game service according to the related art.

Here, a user of the first country 210 and a user of the second country 220 are assumed to play a multi-player game. Here, the multi-player game may refer to an online game play by the user of the first country 210 and the user of the second country 220 in association with a game platform provided by the game server 410. In the related art of FIG. 2, since the user of the second country 220 directly connects to the first game server 211 constructed in the first country 210, the last-mile section significantly increases.

However, in the example of FIG. 4, the user of the second country 220 connects to the first proxy server 420 constructed in the second country 220 and the game server 410 enables a service or a progress of the multi-player game by matching the user of the second country 220 and the user of the first country 210. In this example, from the perspective of the user of the second country 220, the last-mile section is maintained to be a section between a terminal of the user and the first proxy server 420.

According to an exemplary embodiment, it is possible to significantly reduce a last-mile section when providing a global game service, which may be applied to a single country having a large geographical area as well as communication between countries. For example, a country having a large geographical area may have a first local area and a second local area, e.g., a state, city, etc. The local areas may be determined based on a game service quality, the number of last-mile sections, a distance between a user and a game server, an average data throughput in a certain area, and the like. A first local area may have a game server and a second local area may have a proxy server in a country having a large geographical area or across different countries. For example, a game service system may be constructed to provide a game service by installing a game server in a single Internet data centers (IDC) and installing proxy servers in other IDCs, respectively, instead of installing game servers in a plurality of IDCs, respectively.

As described above, since users connect to a lobby server in an integrated lobby form, for example, a lobby server included in the game server 410 of FIG. 4, through a proxy server, instead of connecting to individual lobby servers, a multi-player game may be provided to all of users.

Further, since game servers to which users connect are indistinguishable, there is no need to distinguish users connecting through a game channel and there is no need to manage a channel list.

Figure 5:
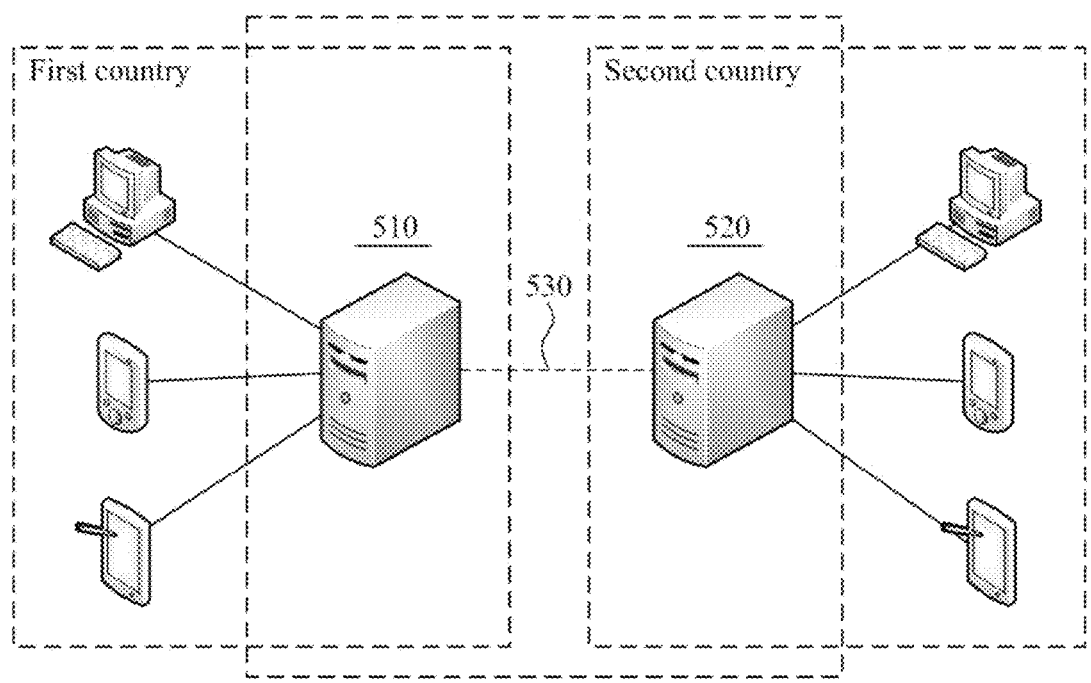
FIG. 5 illustrates a game service system according to an exemplary embodiment.

FIG. 5 illustrates a game service system according to an exemplary embodiment. Referring to FIG. 5, the game service system 500 may include a game server 510 constructed at a single base and a proxy server 520 constructed in a country (second country), which is different from the country (first country) in which the single base is located, and connected to the game server 510 through an exclusive line 530. Here, the game server 510 may provide a game service to users of the other country connected to the proxy server 520 through the proxy server 520 and the exclusive line 530. When the game service system 500 further includes another proxy server in addition to the proxy server 520, the other proxy server may be constructed in another country (third country).

The game server 510 may include a lobby server (not shown) configured to match users of the country in which the single base is located and at least a portion of users of at least one other country in which at least one proxy server is constructed, and a room server (not shown) constructed at a back end of the lobby server and configured to provide a multi-player game service to the matched users through the lobby server.

For example, to play a multi-player game with users of the first country, users of the second country may use a game service by connecting to the proxy server 520 without directly connecting to the game server 510 constructed in the first country. Thus, a last-mile section is significantly reduced and the users of the second country may easily play a multi-player game with users of another country. Accordingly, it is possible to further smoothly match users by expanding a user pool.

The game server 510 and the proxy server 520 will be further described with reference to FIG. 6 through FIG. 10.

Figure 6:
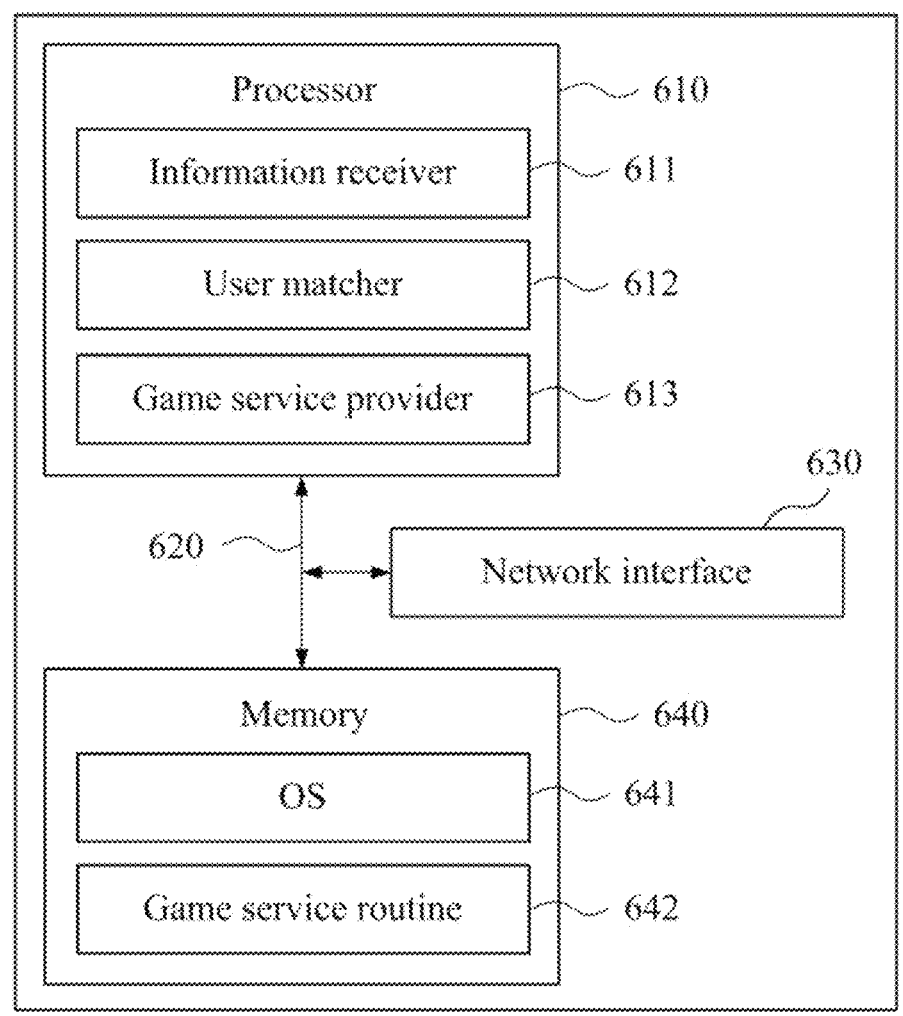
FIG. 6 is a block diagram illustrating a configuration of a game server according to an exemplary embodiment.
Figure 7:
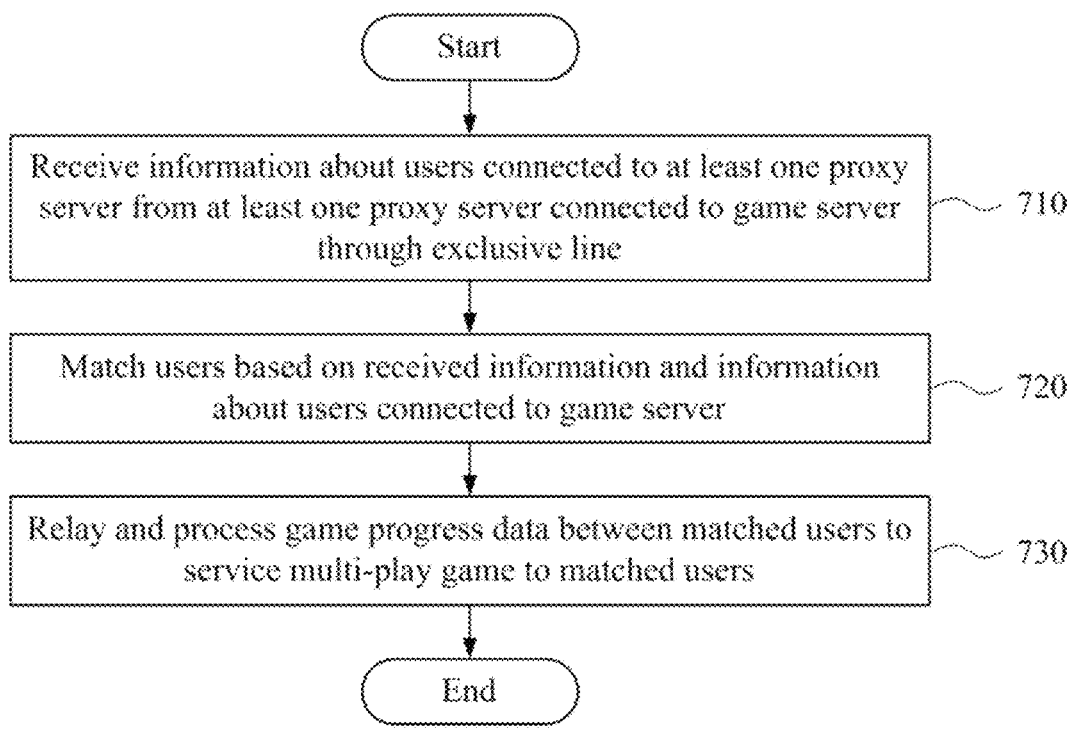
FIG. 7 is a flowchart illustrating an example of a game service method performed by a game server according to an exemplary embodiment.

FIG. 6 is a block diagram illustrating a configuration of a game server according to an exemplary embodiment, and FIG. 7 is a flowchart illustrating an example of a game service method performed by a game server according to an exemplary embodiment.

Referring to FIG. 6, the game server 510 may include a processor 610, a bus 620, a network interface 630, and a memory 640. The memory 640 may include an operating system (OS) 641 and a game service routine 642. The processor 610 may include an information receiver 611, a user matcher 612, and a game service provider 613. According to various exemplary embodiments, the game server 510 may include more constituent elements than the number of constituent elements illustrated in FIG. 6. In general, constituent elements according to the related art may be concisely illustrated. For example, the game server 510 may include other constituent elements such as a display or a transceiver.

The memory 640, as non-transitory computer readable media, may include a permanent mass storage device such as random access memory (RAM), read only memory (ROM), and a disk drive. Also, a program code for the OS 641 and the game service routine 642 may be stored in the memory 640. The software constituent elements may be loaded from non-transitory computer-readable media separate from the memory 640 using a drive mechanism (not shown). The non-transitory computer-readable media may include computer-readable media such as a floppy disk, a tape, a DVD/CD-ROM drive, and a memory card. According to various exemplary embodiments, the software constituent elements may be loaded to the memory 640 through the network interface 630, instead of using the non-transitory computer readable media. For example, the game service routine 642 may be loaded to the memory 640 based on a program installed by files provided from developers over a network.

The bus 620 may enable communication and data transmission between the constituent elements of the game server 510. The bus 620 may be configured using a high-speed serial bus, a parallel bus, a storage area network (SAN), and/or other appropriate communication technologies.

The network interface 630 may be a computer hardware constituent element to connect the game server 510 to a computer network. The network interface 630 may connect the game server 510 to the computer network through a wireless or wired connection.

The processor 610 may be configured to process an instruction of a computer program by performing a basic arithmetic and logic operation, and an input/output (I/O) operation of the game server 510. The instruction may be provided from the memory 640 or the network interface 630 to the processor 610 through the bus 620. The processor 610 may be configured to execute a program code for the information receiver 611, the user matcher 612, and the game service provider 613. The program code may be stored (e.g., the game service routine 642) in a storage device, such as the memory 640.

Here, the information receiver 611, the user matcher 612, and the game service provider 613 may be configured to perform operations 710 through 730 illustrated in FIG. 7.

In operation 710, the information receiver 611 may receive information about users connected to at least one proxy server from the at least one proxy server connected to the game server 510 through an exclusive line. Here, the at least one proxy server may include the proxy server 520 of FIG. 5.

In operation 720, the user matcher 612 may match users based on the received information and information about users connected to the game server 510. For example, the game server 510 may match users by employing, as a user pool, all of users of a first country directly connected to the game server 510 through a lobby server and users of other countries connected to at least one proxy server.

In operation 730, the game service provider 613 may relay and process game progress data between the matched users to service a multi-player game to the matched users. For example, the game server 510 may provide the game service to the matched users through a room server.

The game server 510 may be constructed at a base of a country different from the country in which the at least one proxy server is constructed. The at least one proxy server may process authentication of the connected users, and the game progress data may be forwarded to a user connected to the at least one proxy server through the at least one proxy server, for example, through the exclusive line constructed between the game server 510 and the at least one proxy server. The game server 510 may include a dedicated network interface to communicate with a dedicated network interface of a proxy server 520 connected through an exclusive line dedicated for providing a multi-player game session of a determined game room among users directly connected to the game server and associated with the determined game room and users connected to at least one proxy server and associated with the determined game room.

Figure 8:
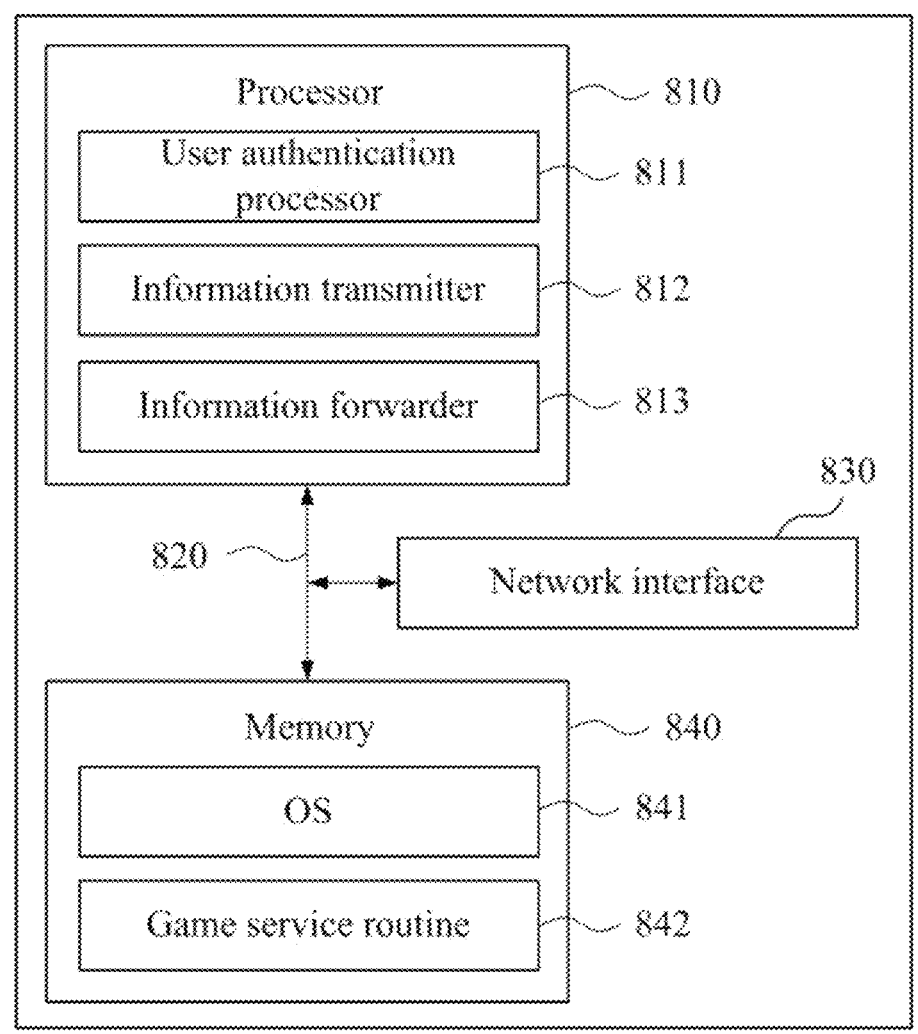
FIG. 8 is a block diagram illustrating a configuration of a proxy server according to an exemplary embodiment.
Figure 9:
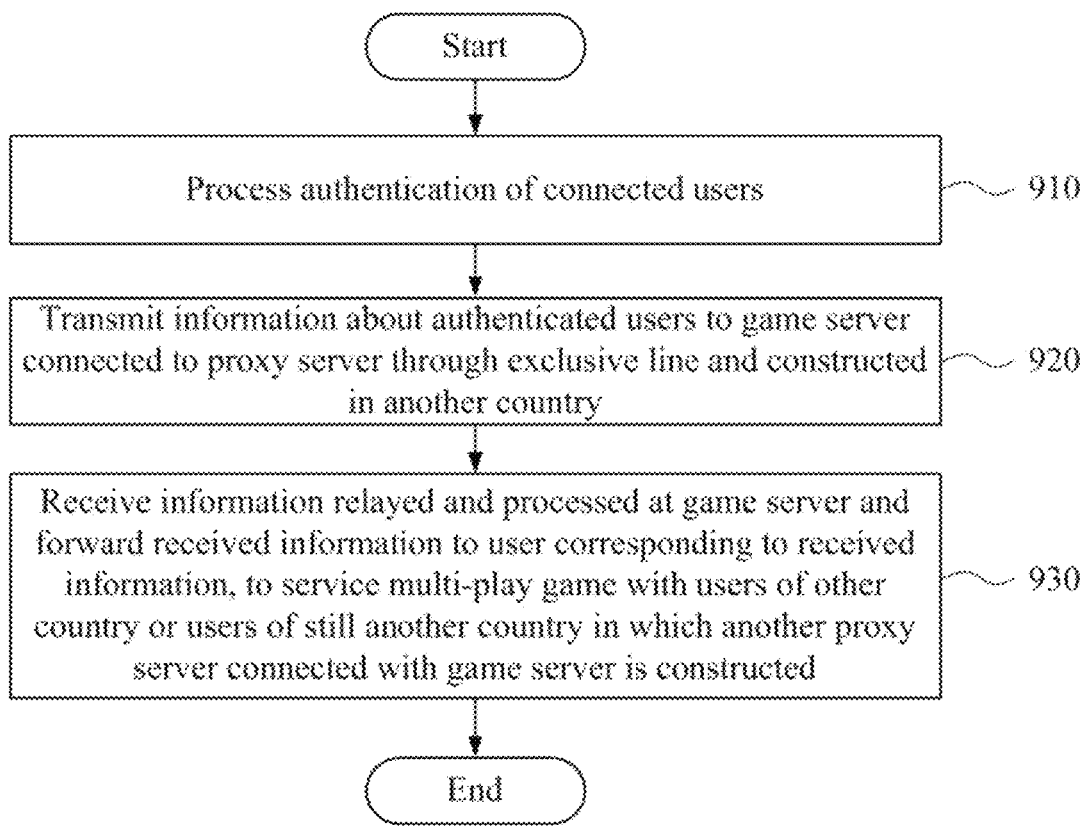
FIG. 9 is a flowchart illustrating an example of a game service method performed by a proxy server according to an exemplary embodiment.

FIG. 8 is a block diagram illustrating a configuration of a proxy server according to an exemplary embodiment, and FIG. 9 is a flowchart illustrating an example of a game service method performed by a proxy server according to an exemplary embodiment.

Referring to FIG. 8, the proxy server 520 may include a processor 810, a bus 820, a network interface 830, and a memory 840. The memory 840 may include an OS 841 and a game service routine 842. The game service routine 842 may include a program code different from the program code of the game service routine 642 of FIG. 6. The processor 810 may include a user authentication processor 811, an information transmitter 812, and an information forwarder 813. According to various exemplary embodiments, the proxy server 520 may include more constituent elements than the number of constituent elements illustrated in FIG. 8. In general, constituent elements according to the related art may be concisely illustrated. For example, the proxy server 520 may include other constituent elements such as a display or a transceiver.

The processor 810, the bus 820, the network interface 830, and the memory 840 may operate in a similar manner to the processor 610, the bus 620, the network interface 630, and the memory 640 of FIG. 6. The user authentication processor 811, the information transmitter 812, and the information forwarder 813 included in the processor 810 may be configured to perform operations 910 through 930 of FIG. 9 based on the game service routine 840 of the memory 840.

In operation 910, the user authentication processor 811 may process authentication of connected users.

In operation 920, the information transmitter 812 may transmit information about the authenticated users to a game server connected to the proxy server 520 through an exclusive line and constructed in another country different from the county in which the proxy server 520 is constructed.

In operation 930, the information forwarder 813 may receive information relayed and processed at the game server and may forward the received information to a user corresponding to the received information, to service a multi-player game with users of the other country or users of still another country in which another proxy server connected with the game server is constructed.

Here, the game server may correspond to the game server 510 described above with reference to FIG. 5 through FIG. 7. To service a multi-player game at the game server, the authenticated users and at least a portion of the users of the other country and the users of the still another country may be matched.

Figure 10:
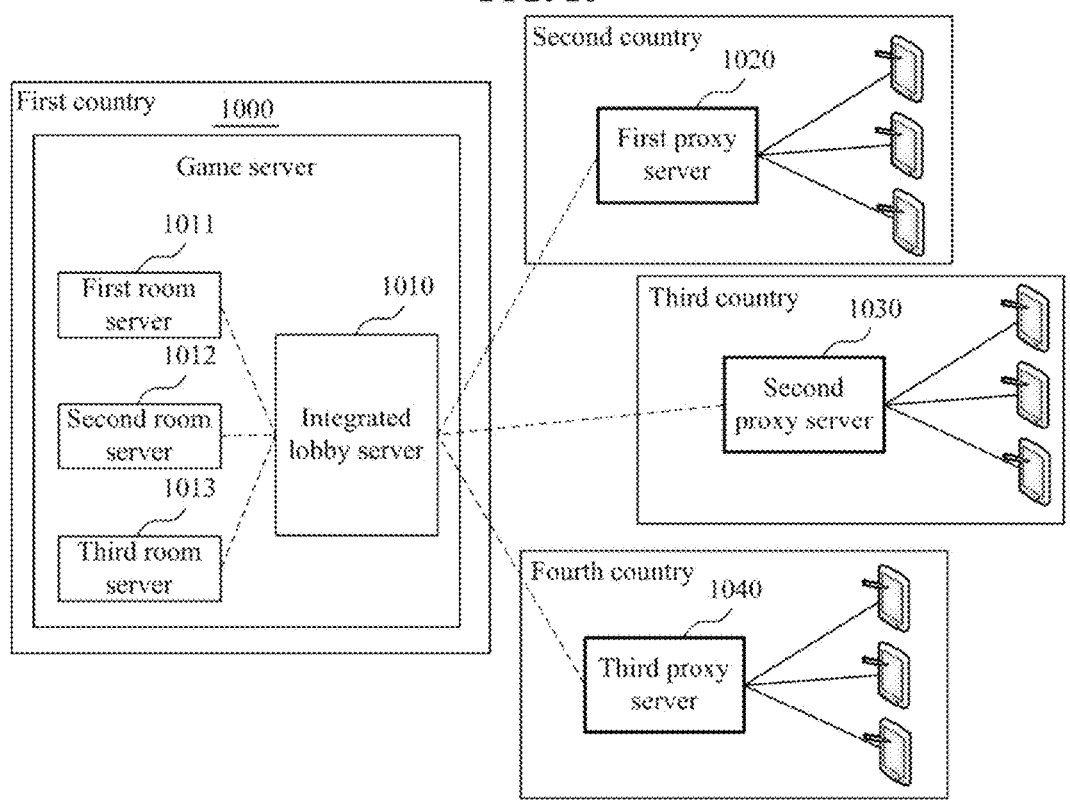
FIG. 10 illustrates an example of a process of matching users using an integrated lobby according to an exemplary embodiment.

FIG. 10 illustrates an example of a process of matching users using an integrated lobby according to an exemplary embodiment. FIG. 10 illustrates a game server 1000 constructed in a first country, a first proxy server 1020 constructed in a second country, a second proxy server 1030 constructed in a third country, and a third proxy server 1040 constructed in a fourth country.

The game server 1000 may include an integrated lobby server 1010, and may include room servers, for example, a first room server 1011, a second room server 1012, and a third room server 1013, constructed at a back end of the integrated lobby server 1010.

Here, users of the first country may use a game service by directly connecting to the game server 1000, and users of the second country, the third country, and the fourth country may use the game service by connecting to the first proxy server 1020, the second proxy server 1030, and the third proxy server 1040, respectively.

Each of the first proxy server 1020, the second proxy server 1030, and the third proxy server 1040 may authenticate users connected thereto, and may transmit information about the authenticated users to the integrated lobby server 1010 included in the game server 1000. The integrated lobby server 1010 may support a multi-player game between users based on information of the users and information of the user directly connected to the game server 1000.

For example, the integrated lobby server 1010 may provide a game service so that a first user of the first country, a second user of the second country, and a third user of the third country may proceed with a multi-player game at the first room server 1011 by matching the first user, the second user, and the third user.

Here, the integrated lobby server 1010 may serve to relay information for progress of a multi-player game. For example, the integrated lobby server 1010 may receive a chat input of the second user by receiving chat information input from a terminal of the second user, through the first proxy server 1020 and directly forward the received chat input to the first user by transmitting chat information to a terminal of the first user, and may forward the received chat input to the third user by transmitting chat information to a terminal of the third user through the second proxy server 1030, thereby supporting a chat service among the first user, the second user, and the third user.

Although FIG. 10 describes three proxy servers, for example, the first proxy server 1020, the second proxy server 1030, and the third proxy server 1040 that are disposed in three countries, the three proxy servers may be expanded to at least one proxy server. Three room servers, for example, the first room server 1011, the second room server 1012, and the third room server 1013 may be expanded to at least one room server.

As described above with reference to FIG. 10, a game service system according to an exemplary embodiment may include the game server 1000 and at least one proxy server constructed in different countries, respectively. Here, the game server 1000 and the at least one proxy server may be connected through an exclusive line. The game server 1000 may include the integrated lobby server 1010 configured to match users directly connected to the game server 1000 and users connected to the at least one proxy server, and at least one room server constructed at a back end of the integrated lobby server 1010 and configured to provide a multi-player game service to the matched users through the integrated lobby server 1010. As described above, the integrated lobby server 1010 may relay game progress data occurring during a progress of the multi-player game service to the matched users, and may forward the game progress data to the users connected to the at least one proxy server through the at least one proxy server.

Figure 11:
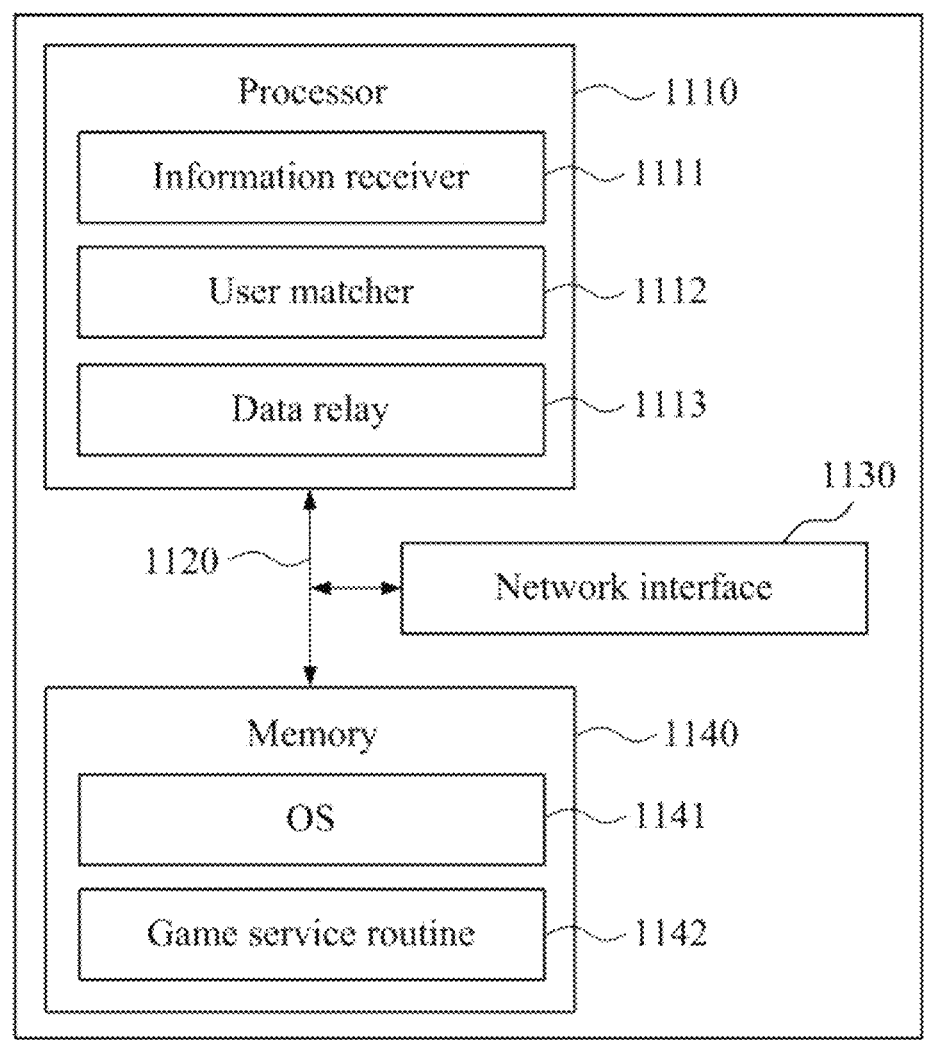
FIG. 11 is a block diagram illustrating a configuration of an integrated lobby server according to an exemplary embodiment.
Figure 12:
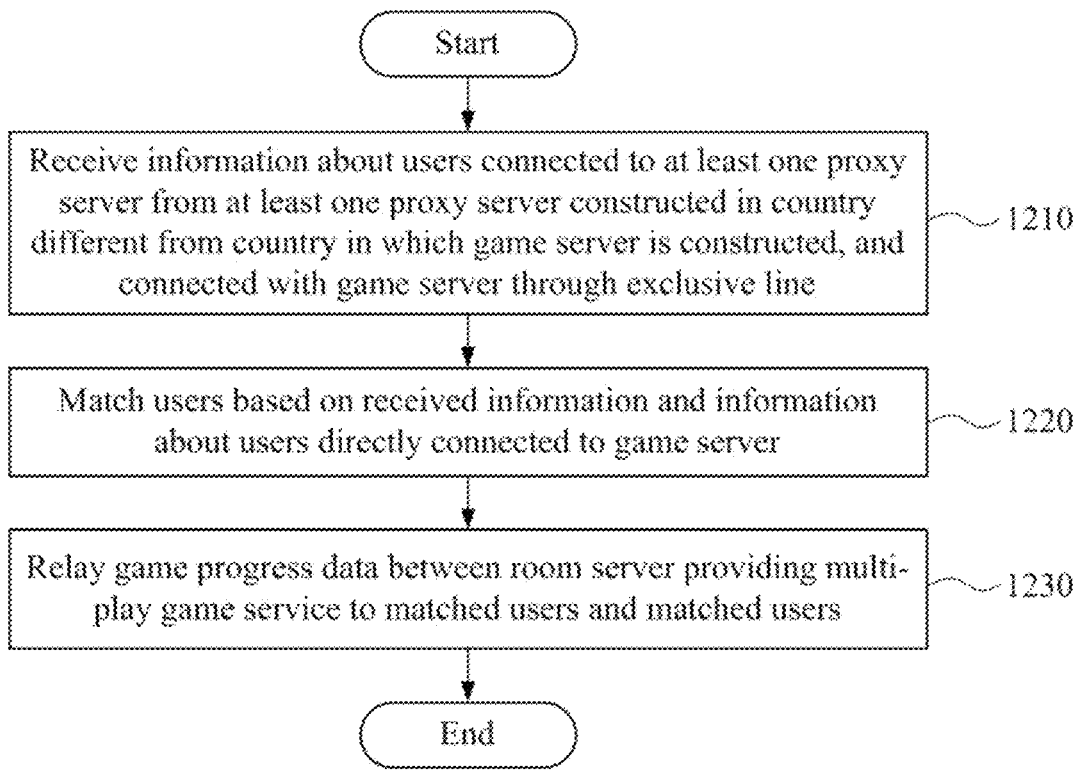
FIG. 12 is a flowchart illustrating a game service method of an integrated lobby server according to an exemplary embodiment.

FIG. 11 is a block diagram illustrating a configuration of an integrated lobby server according to an exemplary embodiment, and FIG. 12 is a flowchart illustrating a game service method of an integrated lobby server according to an exemplary embodiment.

Referring to FIG. 11, the integrated lobby server 1010 may include a processor 1110, a bus 1120, a network interface 1130, and a memory 1140. The common constituent elements are described above and thus, a further detailed description related thereto may be omitted.

An information receiver 1111, a user matcher 1112, and a data relay 1113 included in the processor 1110 may be configured to perform operations 1210 through 1230 of FIG. 12 based on a game service routine 1142 of the memory 1140.

In operation 1210, the information receiver 1111 may receive information about users connected to at least one proxy server from the at least one proxy server constructed in a country different from the country in which a game server is constructed, and connected with the game server through an exclusive line. Here, the game server may correspond to the game server 1000 of FIG. 10 included in the integrated lobby server 1010.

In operation 1220, the user matcher 1112 may match users based on the received information and information about users directly connected to the game server.

In operation 1230, the data relay 1113 may relay game progress data between the room server providing a multi-player game service to the matched users and the matched users. Accordingly, users of different countries may play a multi-player game irrespective of a change of a server to which the users are connected.

The at least one proxy server may process authentication of the users connected to the at least one proxy server. In operation 1230, the data relay 1113 may receive an input from the users connected to the at least one proxy server through the at least one proxy server, and may forward the game progress data to a user connected to the at least one proxy server through the at least one proxy server.

Figure 13:
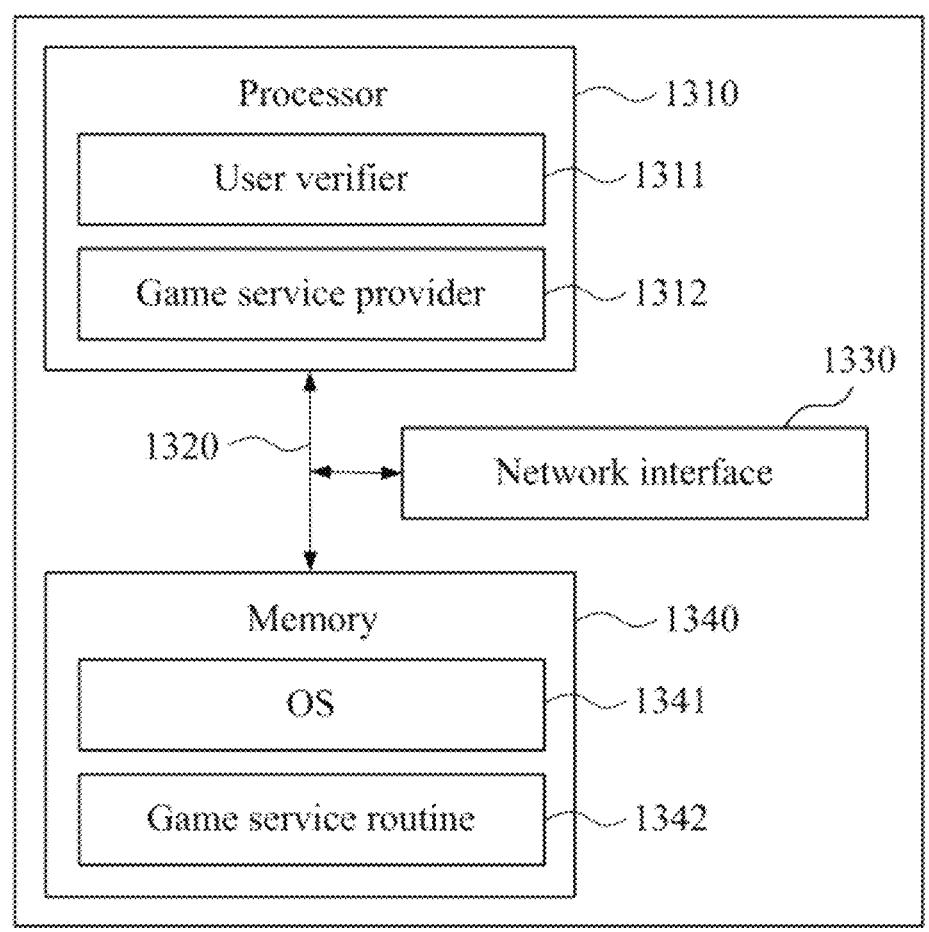
FIG. 13 is a block diagram illustrating a configuration of a room server according to an exemplary embodiment.
Figure 14:
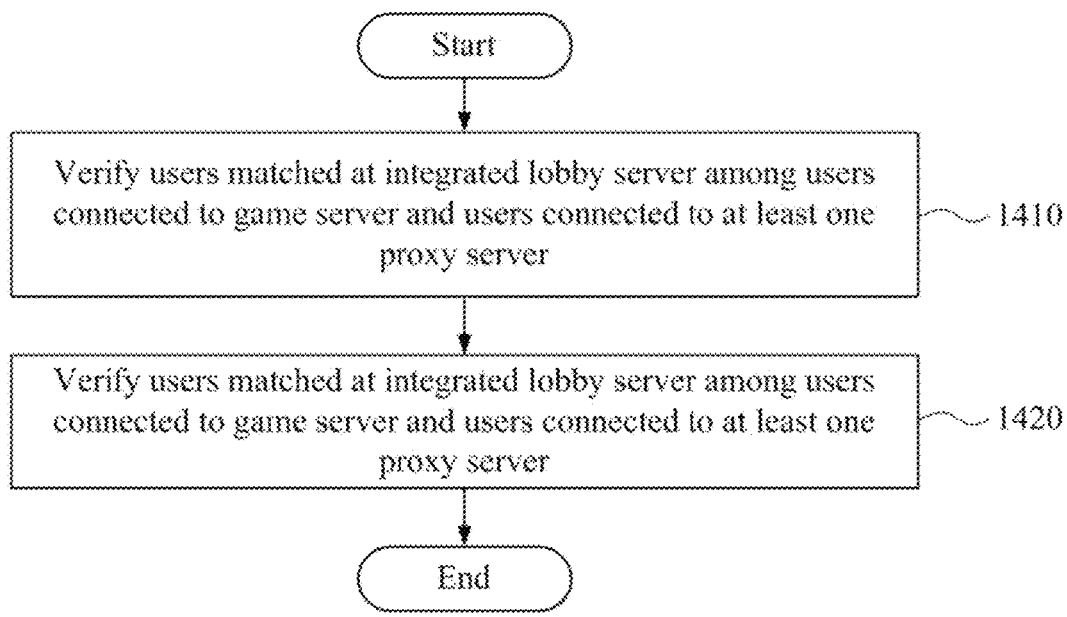
FIG. 14 is a flowchart illustrating a game service method of a room server according to an exemplary embodiment.

FIG. 13 is a block diagram illustrating a configuration of a room server according to an exemplary embodiment, and FIG. 14 is a flowchart illustrating a game service method of a room server according to an exemplary embodiment.

Referring to FIG. 13, the room server 1300 may include a processor 1310, a bus 1320, a network interface 1330, and a memory 1340. The common constituent elements are described above and thus, a further detailed description related thereto may be omitted.

A user verifier 1311 and a game service provider 1312 included in the processor 1310 may be configured to perform operations 1410 and 1420 of FIG. 14 based on a game service routine 1342 of the memory 1340.

In operation 1410, the user verifier 1410 may verify users matched at an integrated lobby server among users connected to a game server and users connected to at least one proxy server. Here, the game server may correspond to the game server 1000 of FIG. 10 including the room server 1300. A plurality of room servers including the room server 1300 may be included in the game server 1000. Also, the game server and the at least one proxy server may be constructed in different countries and be connected through an exclusive line.

In operation 1420, the game service provider 1312 may provide a multi-player game service to the verified users. Game progress data of the multi-player game service may be relayed to the matched users through the integrated lobby server.

According to various exemplary embodiments, it is possible to minimize a last-mile section and to secure the communication performance and stability between a client and a server by enabling users of a game service to use the game service through connection to a proxy server constructed for each region without directly connecting to individual servers such as a lobby server or a room server and by connecting the proxy server and a game server using an exclusive line. According to various exemplary embodiments, it is possible to provide a game service so that all the connected users may play a multi-player game by enabling a lobby server in an integrated lobby form to relay communication with proxy servers and by enabling a backend of the lobby server to provide a game service through a room server.

One or more exemplary embodiments illustrated herein may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A game service system for providing a multi-player game service, the game service system comprising:
    a game server constructed at a single base in a first local area, the game server configured to provide game progress data to users connected to a proxy server associated with the game server; and
    at least one proxy server constructed at a base in a second local area different from the first local area in which the single base is located, and configured to connect to the game server through an exclusive line,
    wherein the game server is configured to provide the game service to users connected to the at least one proxy server through the at least one proxy server and the exclusive line,
    wherein the game server comprises:
    a lobby server configured to match users in the first local area in which the single base is located and at least a portion of users connected to the at least one proxy server in the second local area in which the at least one proxy server is constructed; and
    a room server constructed at a back end of the lobby server and configured to provide a multi-player game service to the matched users through the lobby server,
    wherein the lobby server comprises:
    an information receiver configured to receive information about the users connected to the at least one proxy server from the at least one proxy server constructed in a country different from a country in which the game server is constructed, and connected with the game server through the exclusive line;
    a user matcher configured to match users based on the received information and information about the users directly connected to the game server; and
    a data relay configured to relay game progress data between the room server providing the multi-player game service to the matched users and the matched users, and wherein the users in the first local area connected to the game server and a user connected to the at least one proxy server in the second local area are matched in a same game room by the room server.

2. The game service system of claim 1, wherein the at least one proxy server is configured to process authentication of the connected users, and the game progress data is forwarded to a user connected to the at least one proxy server through the at least one proxy server.

3. The game service system of claim 1, wherein the at least one proxy server comprises:

a user authentication processor configured to process authentication of users connected to the at least one proxy server;

an information transmitter configured to transmit information about the authenticated users to the game server connected to the at least one proxy server through the exclusive line, the game server and being located in a country different from a country in which the at least one proxy server is constructed; and an information forwarder configured to receive information relayed and processed at the game server and to forward the received information to a user corresponding to the received information, to service a multi-player game with users of the other country or users of another country in which another proxy server connected with the game server is constructed.

4. The game service system of claim 3, wherein the game server is configured to match the authenticated users and at least a portion of the users connected to the at least one proxy server and the users connected to the other proxy server, to service the multi-player game.

5. A game service method of a game server providing a multi-player game service, comprising:

receiving information about users connected to at least one proxy server from the at least one proxy server constructed in a country different from a first local area in a country in which the game server is constructed, and connected to the game server through an exclusive line;

matching users in the first local area and at least a portion of users connected to the at least one proxy server in a second local area in which the at least one proxy server is constructed based on the received information and information about users connected to the game server;

providing a multi-player game service to the matched users by a room server connecting the users in the first local area connected to the game server and a user connected to the at least one proxy server in the second local area in a same game room; and relaying and processing game progress data between the room server providing the multi-player game service to the matched users to service a multi-player game to the matched users.

6. The method of claim 5, wherein authentication of the connected users is processed at the at least one proxy server, and the game progress data is forwarded to a user connected to the at least one proxy server through the at least one proxy server.

7. A non-transitory computer-readable recording medium having stored thereon processor executable instructions to implement the method of claim 5.

8. The method of claim 5, wherein the authenticated users and at least a portion of users of a first country and users of a second country are matched at the game server to service the multi-player game.

9. The method of claim 5, wherein authentication of the users connected to the at least one proxy server is processed at the at least one proxy server, and the relaying of the game progress data comprises receiving an input from the users connected to the at least one proxy server through the at least one proxy server, and forwarding the game progress data to a user connected to the at least one proxy server through the at least one proxy server.

* * * * *